United States Patent [15] 3,661,522
Colombo et al. [45] May 9, 1972

[54] PROCESS FOR PRODUCING PIGMENT GRADE TITANIUM DIOXIDE

[72] Inventors: Umberto Colombo, Novara, Italy; Bradford C. Hafford, Palmerton, Pa.; Giuseppe Uglietti, Ternate, Italy

[73] Assignees: Montecatini Edison S.p.A., Milan, Italy; The New Jersey Zinc Company, New York, N.Y., by said Colombo and said Uglietti, part interest to each

[22] Filed: Mar. 31, 1970

[21] Appl. No.: 24,347

[30] Foreign Application Priority Data

Apr. 2, 1969 Italy..................................14981 A/69

[52] U.S. Cl. ...........................................23/202 V, 106/300
[51] Int. Cl. .......................................C01g 23/04, C09c 1/36
[58] Field of Search ................23/202 V, 202, 87 T; 106/300

[56] References Cited

UNITED STATES PATENTS

| | | | |
|---|---|---|---|
| 2,512,341 | 6/1950 | Krchma | 23/202 V |
| 3,069,281 | 12/1962 | Wilson | 23/202 V X |
| 2,823,982 | 2/1958 | Saladin et al. | 23/202 V |
| 2,957,753 | 10/1960 | Nelson et al. | 23/202 V |
| 2,691,571 | 10/1954 | Schaumann et al. | 23/202 V |
| 2,760,846 | 8/1956 | Richmond et al. | 23/202 V |
| 3,120,427 | 2/1964 | Mas et al. | 23/202 V |

*Primary Examiner*—Edward Stern
*Attorney*—Hubbell, Cohen & Stiefel

[57] ABSTRACT

Process for producing pigment grade titanium dioxide by heating titanium tetrachloride to a temperature of from about 1,100° to 1,300° C by mixing with combustion gases having a temperature of from about 1,700° to 2,300° C obtained from the combustion of a mixture of carbon monoxide, oxygen and chlorine, the oxygen in the mixture being present in an amount of about 0.5 to 10.0 percent by volume in excess of the stoichiometric amount required for complete combustion of the carbon monoxide, the chlorine comprising from about 1.0 to 10.0 percent by volume of the mixture, and then reacting the thus heated titanium tetrachloride with oxygen at a temperature of from about 1,000° to 1,500° C. Desirably, the titanium tetrachloride is first preheated to a temperature of about 500° C and the oxygen reactant is preheated to a temperature of about 800° C. The titanium dioxide product obtained has a uniform particle size distribution and an average particle diameter greater than 0.25 microns.

5 Claims, No Drawings

PROCESS FOR PRODUCING PIGMENT GRADE TITANIUM DIOXIDE

BACKGROUND OF THE INVENTION

1. Field of the Invention

The present invention relates to a process for producing titanium dioxide having improved pigmentary characteristics. More particularly, the invention relates to a process for producing titanium dioxide having improved pigmentary characteristics by the combustion of $TiCl_4$ with $O_2$.

2. Description of the Prior Art

The "via chloride" process for producing titanium dioxide involves the reaction of $TiCl_4$ with oxygen or with an oxygen containing gas in a combustion chamber at temperatures greater than 800° C.

The reaction proceeds in accordance with the following equation:

$$TiCl_4 + O_2 \rightarrow TiO_2 + 2Cl_2$$

The chlorine obtained from this reaction is used to produce additional $TiCl_4$ starting material.

Two methods are commonly used for heating the $TiCl_4$ to the reaction temperature. The first is indirect heating of the $TiCl_4$ at a temperature of about 900°-1,000° C in a separate heating chamber. This method has a major disadvantage inasmuch as $TiCl_4$ is extremely corrosive at high temperatures. Thus, the only materials which can be used for the heating chamber are inert materials, such as, for example, silica, amorphous carbon and graphite. These materials, however, in addition to being very expensive, are very brittle at such high temperatures and are subject to breakage.

The second heating method commonly used is direct heating by contacting the $TiCl_4$, prior to reaction, with the hot combustion products obtained by burning a mixture of carbon monoxide and oxygen in an auxiliary flame. The direct heating method avoids the disadvantages of indirect heating inasmuch as (1) the use of a heating chamber composed of such brittle, inert materials is avoided and (2) the reactants are heated to reaction temperature rapidly. However, the direct method has several disadvantages which are not encountered with the indirect method. Thus, for example, the hot combustion gases with which the $TiCl_4$ are mixed must be essentially hydrogen free. Any hydrogen present will form water which reacts with the $TiCl_4$ to form titanium dioxide and hydrogen chloride. The hydrogen chloride produced can not be used to chlorinate the titanium containing raw materials to produce the $TiCl_4$. This makes the process less economical.

Additionally, the mixing of the reagents with the hot combustion gases dilutes the concentration of the reactants in the reaction zone. The lower the temperature of the reactants before being mixed with the hot combustion gases, the more hot combustion gas required to bring the reactants to the desired reaction temperature and thus the greater is the dilution. Such dilution thus produces the economically unfavorable consequence of having to increase the size of the combustion chamber and other reaction chambers. Additionally, the dilution of the reacting materials tends to produce a titanium dioxide product having a preponderance of very fine particles, which is undesirable for use as a pigment.

Thus, it is common, when the direct heating method is used, to introduce nucleating agents into the reaction mixture. Such nucleating agents promote the formation of active centers or nuclei on which the titanium dioxide particles can deposit and grow during the residence time in the reaction zone. The nucleating agents can be introduced directly into the reaction zone as very fine particles of white metal oxides or they can be generated "in situ," such as, for example, by feeding volatile metal halides which can react with the oxygen or any water in the reaction zone to form the corresponding oxide. Typical nucleating agents include $TiCl_3$, $SiCl_4$, $ZrCl_4$, $ZnCl_2$, $TiCl_4$, and the like.

When the direct heating method is used, it is possible to form titanium dioxide nuclei directly from the $TiCl_4$ in the heating step by feeding to the auxiliary flame an amount of oxygen in excess of that required to provide complete combustion of the carbon monoxide.

While the use of such nucleating agents in the direct heating method serves to increase the particle size of the titanium dioxide, it has the disadvantage of producing a product with a non-uniform particle size distribution. A titanium dioxide product having good pigmentation properties should generally have an average particle size of at least about 0.25 microns, more particularly in the range of from about 0.25 to 0.30 microns. Additionally, the distribution should be uniform. When, however, the direct heating method is used in combination with the "in situ" formation of the titanium dioxide nuclei, the product obtained has an average particle size of only about 0.23 microns and an irregular particle size distribution.

As a measure of the average particle size, we adopt the "arithmetic mean," $\overline{d\,10}$, which is defined as follows:

wherein:

$n$ is the total number of particles measured (in our experimental data, $n = 2,000$);

$d_i$ is the diameter of a given particle;

$f_i$ is the frequency, i.e., the number of particles having diameter $d_i$.

This arithmetic mean is defined, for instance, in "Particle size—Theory and Industrial Applications" by Richard D. Cadle, Reinhold Pub. Co., New York 1965, the relevant part of which is incorporated herein by reference. As a measure of the particle size distribution, we adopt the "percent number coefficient of variation." By "percent number coefficient of variation" (hereinbelow simply referred to as $v$), we mean the following percent ratio:

$$v = \frac{s}{\overline{d}_{10}} \times 100$$

wherein:

$s$ is the standard deviation of a distribution, equal to the square root of the variance.

(The variance of a distribution is equal to the mean of the squares of the deviations from the mean).

As is known, the standard deviation is a measure of the average spread of the distribution.

$\overline{d}_{10}$ is the above mentioned arithmetic mean.

This "percent number coefficient of variation" is defined for instance in "Statistical methods in research and production with special reference to the chemical industry" by Owen L. Davies, Oliver and Boyd, London 1963, the relevant part of which is incorporated herein by reference.

SUMMARY OF THE INVENTION

We have discovered a method for producing pigment quality titanium dioxide using the "via chloride" process and the direct heating method described hereinabove wherein the titanium dioxide obtained has an average particle size (measured by means of the above mentioned arithmetic mean) of at least about 0.25 microns.

More particularly, we have discovered that pigment quality titanium dioxide having an average particle size in the range of from about 0.25 to 0.30 microns and having a uniform particle size distribution can be obtained by mixing titanium tetrachloride with the hot gases obtained from the combustion of a mixture of carbon monoxide, oxygen and chlorine, said chlorine being present in the mixture in an amount of from about 1.0 to 10.0 percent by volume and said oxygen being present in an excess of about 0.5 to 10.0 percent by volume over the stoichiometric amount of oxygen needed for complete combustion of the carbon monoxide in the mixture, and then reacting said heated titanium tetrachloride with oxygen at a temperature of from about 1,000° to 1,500° C.

DESCRIPTION OF THE PREFERRED EMBODIMENTS

In a presently preferred embodiment, the process of the present invention comprises first indirectly preheating the $TiCl_4$ to a temperature of about 500° C. It is preferable at this point to add a rutilizing agent to the titanium tetrachloride before proceeding to the direct heating step. Suitable rutilizing agents include titanium trichloride, aluminum trichloride and titanium oxychloride, with aluminum trichloride being preferred.

It is well known that rutile is more valuable as a pigment than anatase. In fact, the mean refractive indexes of anatase and rutile are about 2.57 and 2.71 respectively, the highest of known pigments. Rutile, having the higher refractive index, has a higher opacity than anatase in any given paint medium. Therefore, the tinting strength of rutile is higher than anatase, namely 1,450–1,900 vs. 1,200–1,300.

The preheated titanium tetrachloride is then mixed with the combustion gases resulting from the combustion in an auxiliary flame of the above described mixture of CO, $O_2$, and $Cl_2$. The mixture should be substantially hydrogen-free in order to avoid water formation for the reasons discussed above. As a practical matter, the hydrogen content of the CO charge is not permitted to exceed about 0.2 to 0.3 percent by volume. (Normally, the $O_2$ and $Cl_2$ do not present problems of hydrogen contamination.) As already mentioned, the $Cl_2$ content of the combustion mixture is about 1 to 10 percent by volume, and the $O_2$ content is from about 0.5 to 10 percent by volume in excess of the stoichiometric amount required for the complete combustion of the CO. These combustion gases are at a temperature of about 1,700° to 2,300° C, preferably from about 1,800° to 2,300° C. As a result of this mixing, the titanium tetrachloride is heated to a temperature of from about 1,100° to 1,300° C.

During the intermixing of the titanium tetrachloride and the hot combustion gases, titanium dioxide nuclei begin to grow in the titanium tetrachloride stream due to reaction of the titanium tetrachloride with the excess oxygen present in the combustion gases. Even though chlorine gas is present in the combustion gases, the titanium dioxide nuclei thus formed are not chlorinated due to the highly oxidizing environment in which they exist.

The hot mixture of combustion gases, titanium tetrachloride and titanium dioxide nuclei are then introduced into a reaction chamber with oxygen gas which has been preheated to about 800° C for final conversion to titanium dioxide.

The following examples serve to further illustrate the present invention.

The reactions in each of the following Examples were carried out in an oil cooled, metal walled reactor of the type generally used for this purpose. The reactor consisted of an auxiliary burner, an auxiliary combustion chamber, a titanium tetrachloride preheating chamber, a main combustion chamber and a reaction chamber. A mixture consisting of 14Nm³/h (normal cubic meters per hour) of carbon monoxide (containing 0.2 percent hydrogen) and 7.5Nm³/h of oxygen were fed into the auxiliary burner. In Examples 3 and 4 chlorine gas was also included in this mixture. The auxiliary flame was started by means of an electric coil and the combustion gases obtained were at a temperature of about 1,800° to 2,300° C.

172kg/h of titanium tetrachloride, preheated to 500° C and containing 1 percent of aluminum trichloride as a rutilizing agent, were fed into the titanium tetrachloride preheating chamber. The hot mixture of titanium tetrachloride and the combustion gases were then introduced to the main combustion chamber along with oxygen gas for reaction. The reaction temperature was about 1,400° C.

The reactions in each example were carried out for varying amounts of time and feeding differing amounts of oxygen gas to the reaction chamber.

The reaction conditions, reaction times, titanium dioxide yields and particle size characteristics are set forth in the following table:

TABLE

| EXAMPLE | 1 | 2 | 3 | 4 |
| --- | --- | --- | --- | --- |
| Combustion Gas Composition (Nm³/h): | | | | |
| CO | 14 | 14 | 14 | 14 |
| $O_2$ | 7.5 | 7.5 | 7.5 | 7.5 |
| $Cl_2$ | — | — | 0.7 | 1.7 |
| $O_2$ gas to reaction chamber (Nm³/h) | 27 | 32 | 27 | 27 |
| Reaction Time (hours) | 5.8 | 4 | 2 | 4 |
| $TiO_2$: | | | | |
| Yield (kg) | 367 | 250 | 125 | 250 |
| Arithmetic mean, $d_{10}$ (microns) | 0.22 | 0.23 | 0.26 | 0.27 |
| % number coefficient of variation (v.) | 40 | 40 | 36 | 35 |

As shown in the table, Examples 3 and 4 represent the present invention wherein the hot combustion gases contained chlorine in addition to the products of the combustion of carbon monoxide and oxygen.

In Examples 3 and 4, the titanium dioxide obtained had an average particle size greater than 0.25 microns in diameter. In comparison, the titanium dioxide obtained in Examples 1 and 2, wherein the hot combustion gas contained no chlorine, had an average particle size below 0.25 microns.

Variations can, of course, be made without departing from the spirit and scope of the invention.

Having thus described our invention, what we desire to secure by Letters Patent and hereby claim is:

1. In a process for producing pigment quality rutile titanium dioxide by reacting titanium tetrachloride with an oxygen reactant in the presence of a rutilizing agent at a temperature of from about 1,000° to 1,500° C wherein said titanium tetrachloride is first heated to reaction temperature by mixing with hot combustion gases which are essentially hydrogen free and having a temperature of from about 1,700° to 2,300° C, said hot combustion gases having been obtained from the combustion of a mixture of carbon monoxide and oxygen, and the thus heated titanium tetrachloride is then reacted with said oxygen reactant at said reaction temperature, the improvement which comprises including in said carbon monoxide-oxygen combustion mixture from about 1.0 to 10.0 percent by volume of said combustion mixture of chlorine and from 0.5 to 10.0 percent of volume of oxygen in excess of the stoichiometric amount required for complete combustion of the carbon monoxide in said mixture, thereby ensuring complete combustion of the carbon monoxide and formation and growth of titanium dioxide nuclei, and producing a titanium dioxide product having a uniform particle size distribution and an average particle diameter greater than 0.25 microns and recovering said titanium dioxide product.

2. The process of claim 1 wherein the rutilizing agent is selected from the group consisting of titanium trichloride, aluminum trichloride and a titanium oxychloride, and same is added to the titanium tetrachloride prior to mixing with said combustion gases.

3. The process of claim 2 wherein the rutilizing agent is aluminum trichloride.

4. The process of claim 2 wherein the titanium tetrachloride is preheated to about 500° C prior to mixing with the combustion gases.

5. The process of claim 4 wherein said oxygen reactant is preheated to a temperature of about 800° C prior to said reaction with said heated titanium tetrachloride.

* * * * *